June 24, 1969          M. S. FRANK          3,451,115
PROCESS FOR MAKING AUTOMOBILE WHEELS
Original Filed Sept. 24, 1965          Sheet 2 of 2

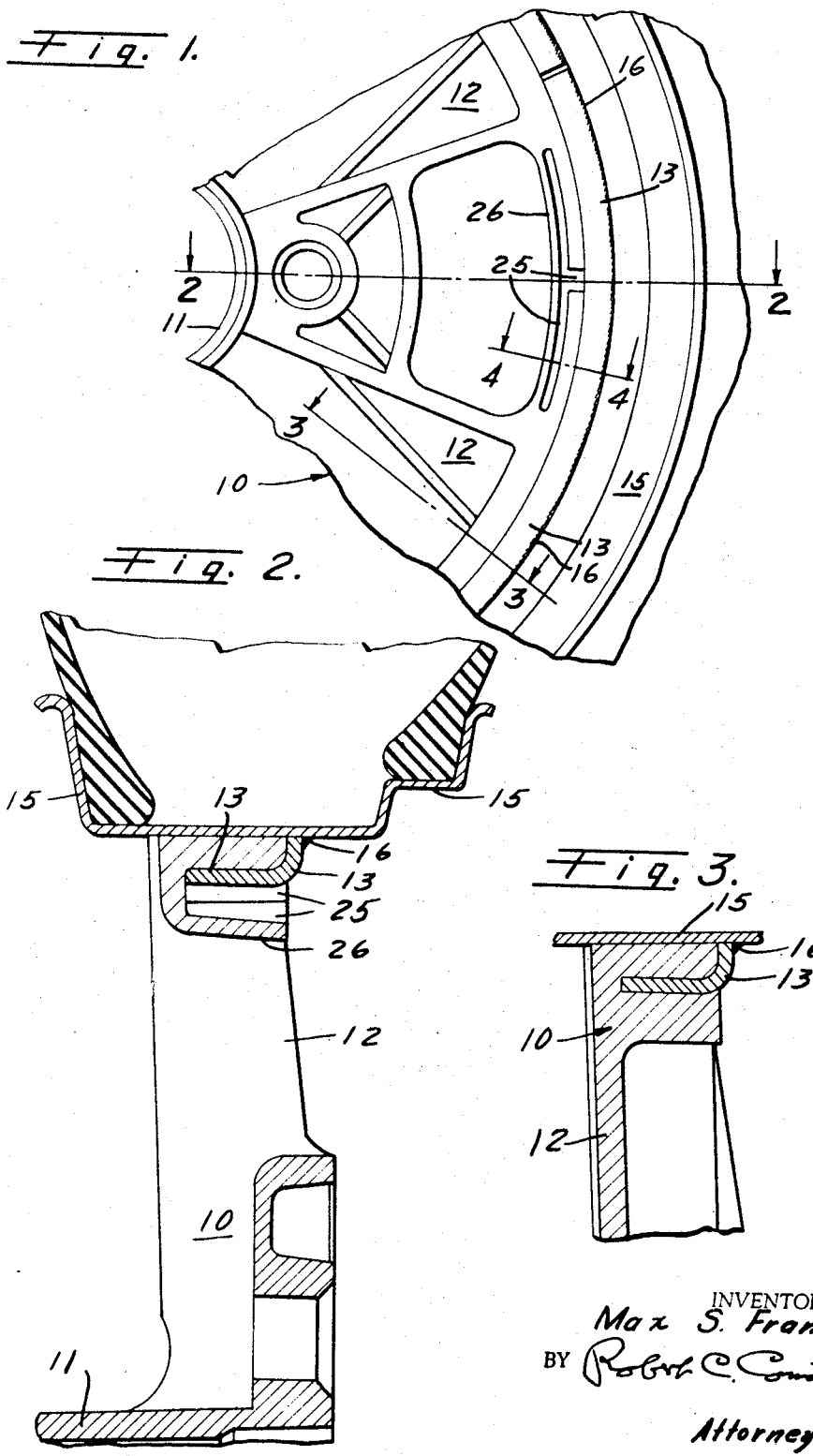

INVENTOR.
Max S. Frank
BY Robert C. Constil
Attorney

United States Patent Office 3,451,115
Patented June 24, 1969

3,451,115
PROCESS FOR MAKING AUTOMOBILE WHEELS
Max S. Frank, West Los Angeles, Calif., assignor, by mesne assignments, to Roy E. Richter, South Gate, Calif.
Original application Sept. 24, 1965, Ser. No. 489,993, now Patent No. 3,361,484, dated Jan. 2, 1968. Divided and this application Dec. 7, 1967, Ser. No. 714,376
Int. Cl. B21f 39/00; B21k 1/34; B60b 1/00
U.S. Cl. 29—159.03        11 Claims

ABSTRACT OF THE DISCLOSURE

A method of making automobile wheels in which a ferrous tire rim is welded to a non-ferrous central section. A continuous ring of ferrous material is incorporated into the central section at the time it is molded. The tire rim is then welded to the ring around the entire periphery of the wheel section. The wheel has a plurality of radial spokes with open areas between them through which portions of the inner periphery of the central section of the wheel are exposed. A smooth finish is maintained on these exposed portions by placing a heated portion of the mold between the reinforcing member and such exposed portions, so that there is no chilling of the metal in such areas when the wheel section is cast. Locator pads and pins are provided to hold the ring in place within the mold when the central section is cast.

Cross-reference to related application

This application is a division of my co-pending application, Ser. No. 489,993, filed Sept. 24, 1965, now Patent No. 3,361,484, issued Jan. 2, 1968.

This invention relates to a wheel for automotive vehicles and to a method of making the same.

A wheel which is formed of cast aluminum or similar non-ferrous material offers many advantages, but it also has certain disadvantages. One of its principal disadvantages is the difficulty of securing it to the tire rim. It cannot feasibly be welded and other types of fastening are unsatisfactory either because of excessive cost, looseness due to vibration or other reasons.

It is accordingly among the objects of this invention to provide a process for making a cast wheel central section which is capable of being welded to a ferrous tire rim around its entire periphery. In essence, the invention contemplates incorporating into the wheel section at the time it is cast a continuous ring of ferrous material which is so oriented that it provides a continuous band of ferrous material extending around the entire periphery of the wheel section, directly adjacent to the tire rim. The tire rim can then be welded to such band around the entire periphery of the wheel section.

Another disadvantage of a wheel section which is cast from nonferrous material is that it is structurally weak compared to ferrous materials. It is accordingly among the objects of this invention to provide a process for making a wheel section in which the above described ring of ferrous material also acts as a strengthening member to reinforce the entire wheel and to assure its proper concentricity.

One problem which arises in incorporating a previously formed reinforcing member into a casting is that the temperature differential between the reinforcing member and the molten casting material is so great that the reinforcing member tends to "chill" the molten metal and cause a surface area adjacent to the chilling which is rough and uneven, rather than smooth. This is particularly undesirable in the areas of the wheel which are visible in use. Such visible areas should preferably have a so-called "hardware" finish which requires little buffing or polishing.

It is accordingly a further object of the present invention to provide a process for incorporating a reinforcing member into a cast wheel section while at the same time maintaining a smooth, perfectly cast surface without undesirable chilling occurring, particularly in the exposed surface areas. This is accomplished by interposing a portion of the heated mold between the reinforcing member and the exposed surface of the wheel section to prevent chilling of the exposed surface area by the reinforcing member.

Another problem which arises in casting a wheel section with a continuous ring reinforcing member is the problem of holding and orienting the reinforcing member before and during the casting operation. It is another object of this invention to provide a process for orienting and holding the reinforcing member in its proper position before and during the casting operation.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referriyng to the drawings,

FIG. 1 is a rear elevational view of a section of an automatic wheel formed in accordance with the present invention;

FIG. 2 is a sectional view of the same, taken along line 2—2 of FIG. 1;

FIG. 3 is a sectional view of the same, taken along line 3—3 of FIG. 1;

Figure 9:
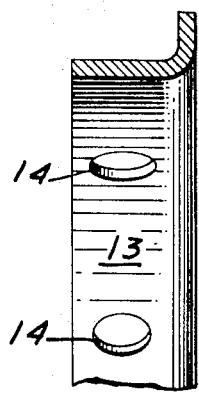
FIG. 9 is a sectional view of the reinforcing member, taken along line 9—9 of FIG. 8.

A preferred embodiment which has been selected to illustrate my invention comprises a wheel 10 having a nave 11 and spokes 12, all of which are preferably cast of non-ferrous material such as aluminum or the like. Extending around the entire periphery of the wheel 10 is a circular reinforcing member 13, which is preferably formed of ferrous material such as steel or the like. The reinforcing member 13 is preferably L-shaped in cross-section, as shown in FIG. 9 of the drawings, and has a plurality of spaced openings 14 extending through it which provide a better bond between the reinforcing member 13 and the wheel 10.

As shown in FIGS. 2 and 3 of the drawings, the reinforcing member 13 is disposed directly adjacent to the steel tire rim 15, so that a continuous weld 16 can be provided around the entire periphery of the wheel 10. This provides a strong and permanent connection between the wheel 10 and the rim 15. The tire is held within the rim 15.

The method of making the wheel 10 and the method of holding the reinforcing member 13 in place before and during the molding operation are shown in FIGS. 4–7, inclusive, of the drawings. The wheel is cast in a two-part mold comprising a female part 17 and a male part 18. The female part 17 is provided with a main opening 19, adjacent one corner of which is a step 20.

The male part 18 is provided with an arcuate portion 21, which is adapted to receive and seat the curved corner portion of the reinforcing member 13. The male part 18 is also provided with an upright mold portion 22, which is somewhat shorter in length than the depth of the opening 19 in the female part 17.

Figure 4:
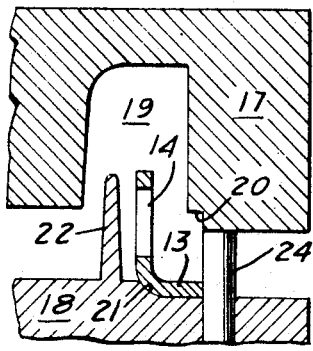
FIG. 4 is a sectional view of the mold in open position, with the reinforcing member disposed therein, showing the formation of the mold which forms the portion of the wheel disposed along line 4—4 of FIG. 1.
Figure 6:
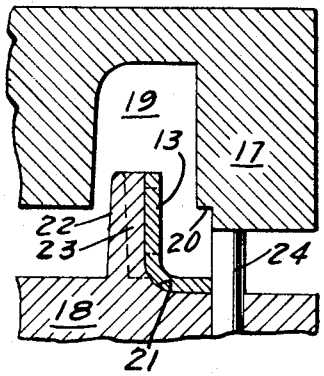
FIG. 6 is a sectional view of the mold in open position, with the reinforcing member disposed therein, showing the formation of the mold which forms the portion of the wheel along line 2—2 of FIG. 1.
Figure 5:
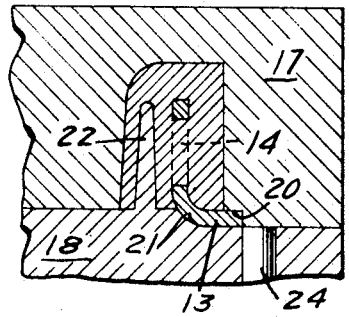
FIG. 5 is a sectional view of the same portion of the mold in closed position and filled.
Figure 7:
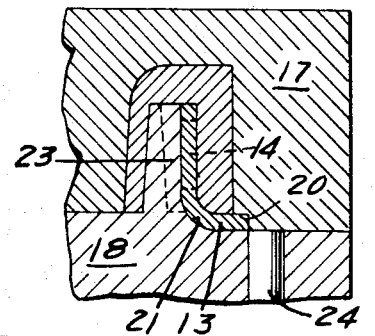
FIG. 7 is a sectional view of the same portion of the mold in closed position and filled.
Figure 8:
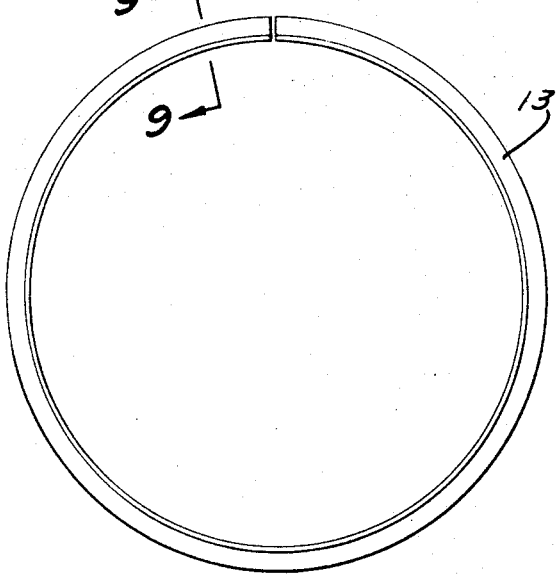
FIG. 8 is a top plan view of the reinforcing member.

The male part 18 is also provided with a plurality of spaced locater pads 23, which form integral extensions of the mold portions 22. As shown in FIG. 6 of the drawings, the locator pads 23 extend between the upright portions 22 and the reinforcing member 13.

The male part 18 also carries a plurality of spaced locator pins 24, which are normally urged toward the female part 17 by resilient or hydraulic means (not shown in the drawings). The locator pins 24 are mounted for reciprocal movement along their longitudinal axes and are retracted when the mold is closed by bringing the parts 17 and 18 together.

It will be seen that the reinforcing member 13 is located in the male part 18 of the mold, with its curved corner portion resting in the arcuate portion 21, and with one side engaging the locator pads 23 and one edge engaging the locator pins 24. The reinforcing member 13 is thus securely held in place when the mold is in open position.

When the mold is closed, the locator pins 24 are retracted, but the edge of the reinforcing member 13 which was disposed adjacent to the locator pins 24 is held within the step 20 in the female part 17. The reinforcing member 13 is thus held in its proper position during the casting operation.

It will also be noted that the mold portion 22 of the male part 18, which is normally heated along with the entire mold, is interposed between the reinforcing member 13 and the outer surface of the wheel. This prevents any chilling of the cast metal from marring the outer surface of the wheel. If any chilling occurs, it will occur along the air gap 25 which is disposed between the reinforcing member 13 and the outer surface of the wheel.

The heated mold portions 22 need be provided only along the portions of the wheel where the cast metal is relatively thin. In such areas, chilling is most likely to occur and mar the exposed surface by causing the cast metal to pull away from the mold and form a rough, uneven surface which is difficult and expensive to polish out because of the irregular contour of the wheel.

It will be noted that the reinforcing member 13 provides a continuous ring which extends around the entire periphery of the wheel in order to strengthen its thinner and weaker portions.

The locator pins 24 may also serve an added purpose by engaging overflow portions of the cast wheel in order to help eject the parts from the mold.

After the wheel has been removed from the mold, the edge of the reinforcing member which was disposed within the step 20 protrudes somewhat beyond the edge of the wheel 10. This protruding portion is preferably machined off before the wheel 10 is attached to the rim 15.

I claim:

1. The method of forming a wheel for automotive vehicles comprising casting said wheel of non-ferrous materials in a mold, placing within said mold before casting said wheel a reinforcing member comprising a continuous ring of ferrous material, said reinforcing member having a plurality of spaced openings extending therethrough, said reinforcing being substantially L-shaped in cross section, orienting said reinforcing member within said mold so that one leg thereof will extend substantially into the center of the periphery of the cast wheel, while the other leg extends outwardly from the wheel with the end thereof adjacent one edge of the periphery of the wheel, and welding a ferrous tire rim to said reinforcing member continuously around the entire periphery of the wheel.

2. The method described in claim 1, and providing an arcuate upright member between at least a part of said reinforcing member and the adjacent periphery of said wheel to prevent said reinforcing member from chilling said periphery during the casting of said wheel.

3. The method described in claim 2, and providing in said mold means for forming a plurality of spaced spokes in said wheel with open areas therebetween through which portions of the inner periphery of the wheel are visible, said upright portions being aligned with and substantially equal in length to said visible portions, to prevent marring the finish of said visible portions of said wheel during the casting thereof.

4. The method described in claim 3, and providing means on said mold for holding said reinforcing member in proper position within said mold before and during the casting of said wheel.

5. The method described in claim 3, and providing a short locator pad on each of said upright portions to hold one leg of said reinforcing member, providing a plurality of retractable locator pins extending between the parts of said mold when said mold is open to hold the other leg of said reinforcing member, and providing means on said mold for engaging said last named leg of said reinforcing member upon the retraction of said locator pins.

6. The method of forming a wheel for automotive vehicles comprising casting said wheel of non-ferrous materials in a mold having a male part and a female part, placing within said male part before casting a reinforcing member comprising a continuous ring of ferrous material, said reinforcing member having a plurality of spaced openings extending therethrough, said reinforcing member being substantially L-shaped in cross section, orienting said reinforcing member within said mold so that one leg thereof will extend substantially into the center of the periphery of the cast wheel, while the other leg extends outwardly from the wheel with the end thereof adjacent to one edge of the periphery of the wheel, providing on said male part a plurality of spaced arcuate upright portions, said upright portions being shorter in length than the depth of the corresponding portion of said female part, providing means in said mold for forming a wheel having a plurality of spaced radial spokes with open areas therebetween through which portions of the inner periphery of said wheel are exposed, orienting said upright portions so that they extend continuously along each of the portions of said male part which forms the exposed portions of the wheel, said upright portions acting to prevent said reinforcing member from chilling said exposed portions when said wheel is cast, providing a locator pad formed integrally with each of said upright portions and disposed adjacent the midportion thereof, said locator pads engaging and holding one leg of said reinforcing member, providing a plurality of spaced locator pins extending between said male and female parts when said mold is open, said locator pins engaging the other leg of said reinforcing member to hold said reinforcing member in proper position when said mold is open, retracting said locator pins when said mold is closed, and providing on said female part a step, said step fitting around and engaging the end of the leg of said reinforcing member adjacent to said locator pin, to hold said reinforcing member in proper position when said mold is closed, and welding a ferrous tire rim to said wheel after said wheel has been cast, said welding extending continuously around the entire periphery of said wheel.

7. The method of forming a wheel for automotive vehicles comprising casting said wheel of non-ferrous materials in a mold, placing within said mold before casting a reinforcing member comprising a continuous ring of ferrous material, said reinforcing member having a plurality of spaced openings extending therethrough, said reinforcing member being substantially L-shaped in cross section, orienting said reinforcing member within said mold so that one leg thereof will extend substantially into the center of the periphery of the cast wheel, while the other leg extends outwardly from the wheel with the end thereof adjacent to one edge of the periphery of the wheel, providing on said male part having a plurality of spaced arcuate upright portions to prevent said reinforcing member from chilling the adjacent periphery portion when said wheel is cast, providing locator means on each of said upright portions to engage one leg of said reinforcing member, providing a plurality of spaced locator pins extending between said male and female parts when said mold is open to engage the other leg of said reinforcing member when said mold is open, retracting said locator pins when said mold is closed, providing on said female part a step engaging the leg of said reinforcing member adjacent to said locator pin when said mold is closed, and welding a ferrous tire rim to said wheel after said wheel has been cast, said welding extending continuously around the entire periphery of said wheel.

8. The method of forming a wheel for automotive vehicles comprising casting said wheel of non-ferrous materials in a mold, placing within said mold before casting a reinforcing member comprising a continuous ring of ferrous material, orienting said reinforcing member within said mold so that a portion thereof will protrude adjacent to one edge of the periphery of the wheel, and welding a ferrous tire rim to the protruding portion of said reinforcing member continuously around the entire periphery of the wheel.

9. The method described in claim 8, and providing means on said mold for preventing said reinforcing member from chilling at least a portion of the periphery of said wheel when said wheel is cast.

10. The method described in claim 9, and providing means on said mold for holding said reinforcing member in proper position within said mold before and during the casting of said wheel.

11. The method of forming a wheel for automotive vehicles comprising casting said wheel of non-ferrous materials in a mold, placing within said mold before casting a reinforcing member comprising a continuous ring of ferrous material, said reinforcing member having a plurality of spaced openings extending therethrough, said reinforcing member being substantially L-shaped in cross section, orienting said reinforcing member within said mold so that a portion thereof extends outwardly to the periphery of the wheel, providing on said mold a plurality of spaced arcuate upright portions to prevent said reinforcing member from chilling said exposed portions when said wheel is cast, providing means on said mold for holding said reinforcing member in proper position within said mold before and during the casting of said mold, and welding a ferrous tire rim to said wheel after said wheel has been cast, said welding extending continuously around the entire periphery of said wheel.

References Cited

UNITED STATES PATENTS

| | | | |
|---|---|---|---|
| 2,653,547 | 9/1953 | Langdon | 29—470.7 |
| 3,250,571 | 5/1966 | Richter | 301—65 |
| 3,250,572 | 5/1966 | Walker | 29—159.03 X |
| 3,302,273 | 2/1967 | Benton et al. | 29—159 |

THOMAS H. EAGER, *Primary Examiner.*

U.S. Cl. X.R.

29—470.7; 301—65